(12) United States Patent
Zhu et al.

(10) Patent No.: US 11,933,807 B2
(45) Date of Patent: Mar. 19, 2024

(54) MEASURING DEVICE FOR DETERMINING THE DENSITY, THE MASS FLOW AND/OR THE VISCOSITY OF A GAS-CHARGED LIQUID, PROCESSING SYSTEM HAVING SUCH A MEASURING DEVICE, AND METHOD FOR MONITORING A GAS-CHARGED LIQUID

(71) Applicant: Endress+Hauser Flowtec AG, Reinach (CH)

(72) Inventors: Hao Zhu, Freising (DE); Michael Wiesmann, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 17/616,973

(22) PCT Filed: May 4, 2020

(86) PCT No.: PCT/EP2020/062249
§ 371 (c)(1),
(2) Date: Dec. 6, 2021

(87) PCT Pub. No.: WO2020/244855
PCT Pub. Date: Dec. 10, 2020

(65) Prior Publication Data
US 2022/0334038 A1    Oct. 20, 2022

(30) Foreign Application Priority Data

Jun. 5, 2019 (DE) .................... 10 2019 115 215.1

(51) Int. Cl.
*G01N 9/32*     (2006.01)
*G01F 1/84*     (2006.01)
*G01N 11/04*    (2006.01)

(52) U.S. Cl.
CPC ............. *G01N 9/32* (2013.01); *G01F 1/8422* (2013.01); *G01F 1/8427* (2013.01);
(Continued)

(58) Field of Classification Search
CPC ................................ G01N 9/32; G01F 1/8422
(Continued)

(56) References Cited

U.S. PATENT DOCUMENTS

2011/0023626 A1* 2/2011 Weinstein ............... G01F 15/02
137/15.01

FOREIGN PATENT DOCUMENTS

DE    102009000749 A1    8/2010
DE    102015112737 A1    2/2017
(Continued)

*Primary Examiner* — Alexander A Mercado
*Assistant Examiner* — Rodney T Frank
(74) *Attorney, Agent, or Firm* — Kelly J. Smith; Endress+Hauser (USA) Holding, Inc.

(57) ABSTRACT

A measuring device for determining the density, the mass flow and/or the viscosity of a gas-charged liquid includes an oscillator, having a media-conducting measuring tube and two vibrational modes having media-density-dependent natural frequencies; an exciter for exciting the two vibrational modes; a vibrational sensor for detecting vibrations of the oscillator; and an operating and evaluating circuit to apply an excitation signal to the exciter, detect signals of the vibration sensor, determine current values of the natural frequencies of the two vibrational modes of the oscillator and fluctuations of the natural frequencies. The operating and evaluating circuit is designed to determine a first media state value, wherein the operating and evaluating circuit is furthermore designed to determine a second media state value which represents a gas charge of the medium.

11 Claims, 3 Drawing Sheets

(52) U.S. Cl.
CPC .......... *G01F 1/8431* (2013.01); *G01F 1/8477* (2013.01); *G01N 11/04* (2013.01)

(58) Field of Classification Search
USPC ......................................... 73/32 A
See application file for complete search history.

(56) References Cited

FOREIGN PATENT DOCUMENTS

| | | |
|---|---|---|
| DE | 102016007905 A1 | 1/2018 |
| DE | 102017115251 A1 | 1/2019 |
| DE | 102018101923 A1 | 5/2019 |
| EP | 2275787 A2 | 1/2011 |
| EP | 2286189 A1 | 2/2011 |
| WO | 2019219321 A1 | 11/2019 |

* cited by examiner

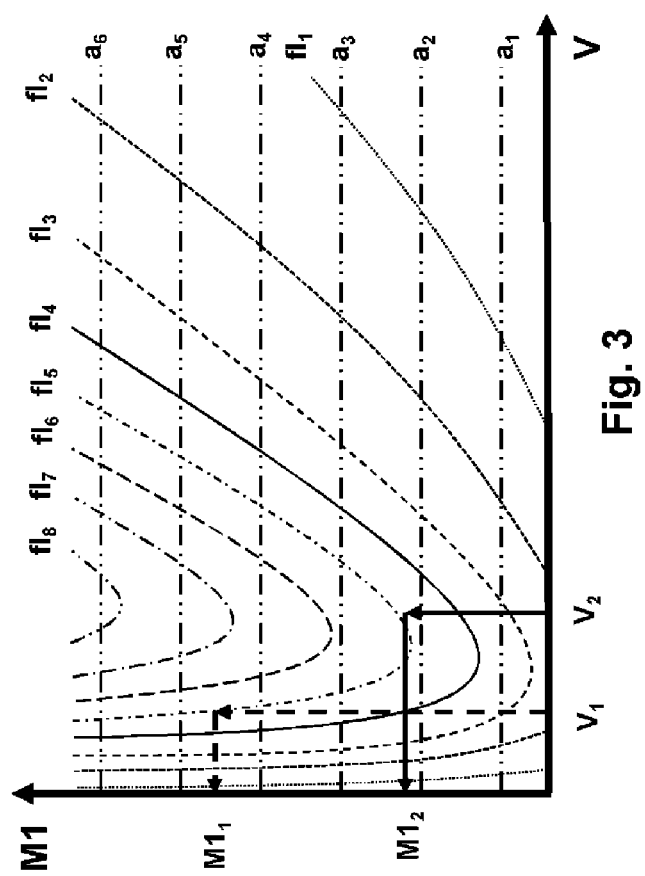
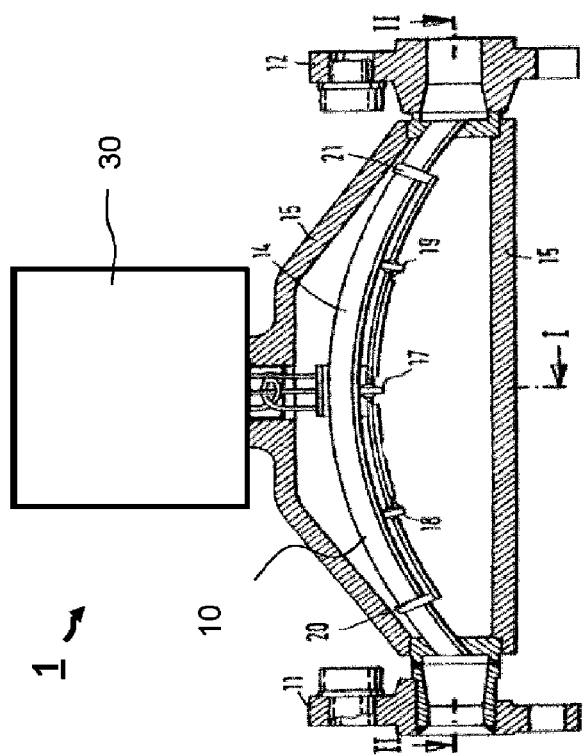
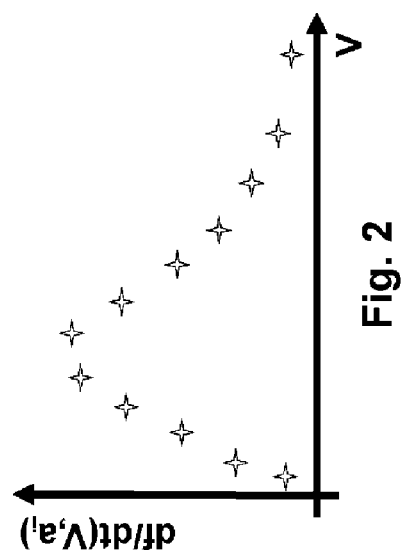
Fig. 1
Fig. 2
Fig. 3

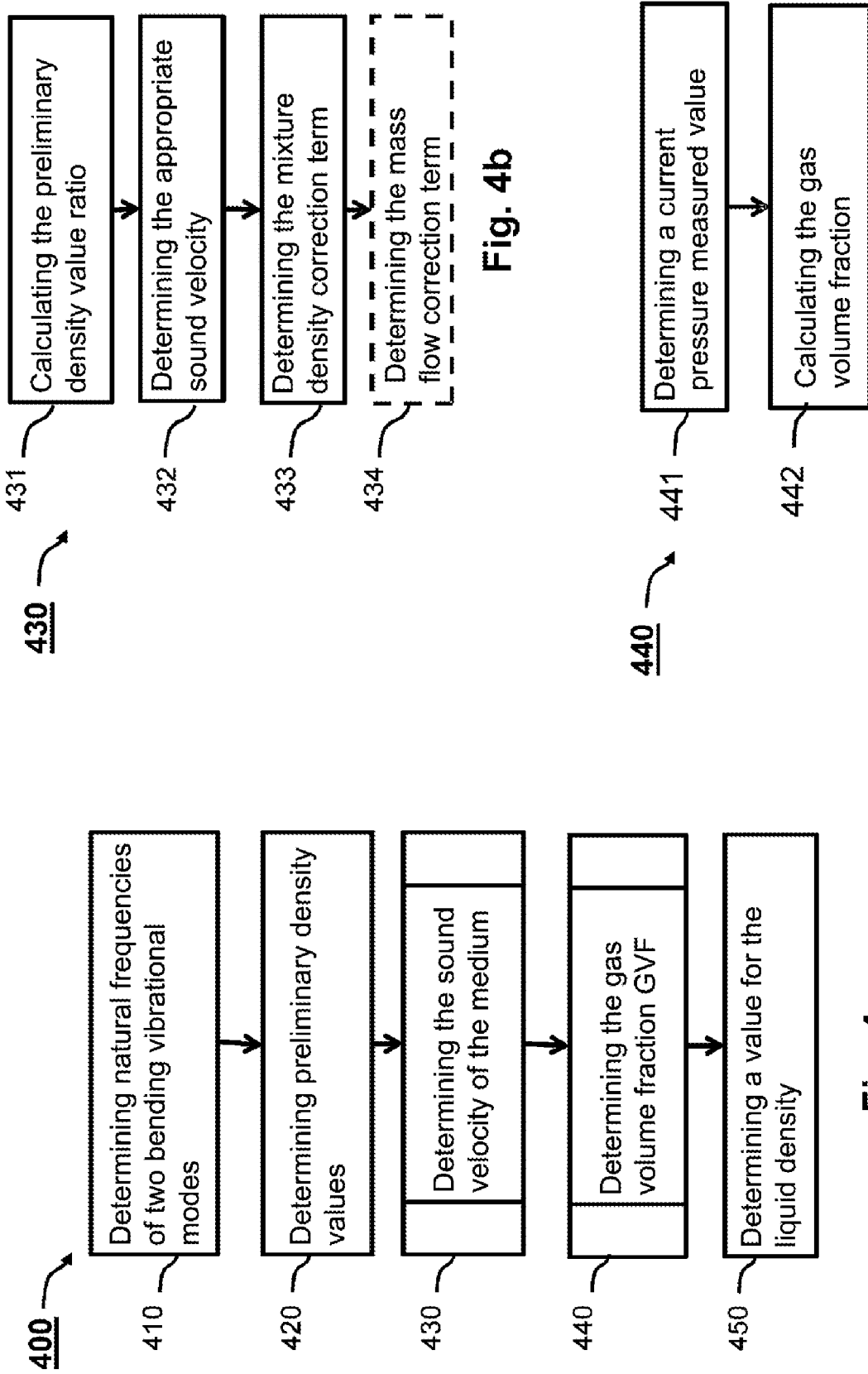

MEASURING DEVICE FOR DETERMINING THE DENSITY, THE MASS FLOW AND/OR THE VISCOSITY OF A GAS-CHARGED LIQUID, PROCESSING SYSTEM HAVING SUCH A MEASURING DEVICE, AND METHOD FOR MONITORING A GAS-CHARGED LIQUID

CROSS-REFERENCE TO RELATED APPLICATIONS

The present application is related to and claims the priority benefit of German Patent Application No. 10 2019 115 215.1, filed on Jun. 5, 2019, and International Patent Application No. PCT/EP2020/062249, filed on May 4, 2020, the entire contents of which are incorporated herein by reference.

TECHNICAL FIELD

The present invention relates to a measuring device for determining the density, the mass flow, and/or the viscosity of a gas-charged liquid, a processing system having such a measuring device, and a method for monitoring a gas-charged liquid. It is a measuring device having at least one oscillator which has at least one vibratable measuring tube for conducting the medium, and which has at least two vibrational modes whose natural frequencies depend upon the average density of the gas-charged liquid and upon the gas volume fraction of the gas-charged liquid.

BACKGROUND

It is known that density and flow measurement, due to the resonator effect, have cross-sensitivities to the gas charge with micro-bubbles. The first published patent application DE 10 2015 122 661 A1 discloses a method for compensating for the influence of this cross-sensitivity, wherein the natural frequencies of two bending vibrational modes are evaluated for this purpose. The result of this method is a value for the average density of the gas-charged liquid and an associated mass flow measured value.

The first published patent application DE 10 2016 114 972 A1 discloses a method for determining the gas volume fraction of a gas-charged liquid which is linked to the aforementioned method, wherein, here, a pressure measured value for the mixture is also incorporated into the calculation of the gas volume fraction, in addition to the natural frequencies of the two vibrational modes. If the gas volume fraction and the average density of the gas-charged liquid are known, the density of the liquid phase can also be calculated.

The above approaches are valid to the extent that the suspended micro-bubbles are suspended essentially homogeneously in the liquid, i.e., the medium acts macroscopically as a homogeneous mixture. However, if larger free bubbles occur which macroscopically lead to spatially heterogeneous distributions, the methods, which are based upon the assumption of a homogeneous, compressible mixture, meet their limits. Although the properties of the macroscopically homogeneous mixture are still recorded reasonably accurately, the gas charge in the free bubbles is not truly identifiable by these methods.

Spatially heterogeneous distributions of gas inclusions in a flowing medium lead to temporal density fluctuations at the location of a flow-through measuring device, which can be detected as fluctuations in the natural frequency of bending vibrational modes. The as yet unpublished patent applications DE 10 2018 112 002.8 and DE 10 2019 003 075.3 describe measuring devices and methods that make it possible to draw conclusions, on the basis of the frequency fluctuations, about the presence of free bubbles.

SUMMARY

The aim of the present invention is to provide a measuring device and a method which are suitable for characterizing a gas-charged liquid over a wide range of mixing ratios. The aim of the present invention is furthermore to provide a processing system which is suitable for processing a gas-charged liquid. The aim is achieved according to the invention by the measuring device, the processing system, and the method according to the present disclosure.

The measuring device according to the invention comprises:
  an oscillator having at least one vibratable measuring tube for conducting the medium, and having at least two vibrational modes whose natural frequencies depend upon the average density of the gas-charged liquid and upon the gas volume fraction of the gas-charged liquid;
  at least one exciter for exciting both vibrational modes;
  at least one vibrational sensor for detecting vibrations of the oscillator; and
  an operating and evaluating circuit configured to apply an excitation signal to the exciter, to detect signals of the vibrational sensor, to determine current values of the natural frequencies of both vibrational modes of the oscillator and fluctuations of at least one of the natural frequencies on the basis of the signals of the vibrational sensor,
  wherein the operating and evaluating circuit is further configured to determine a first media state value on the basis of the fluctuations.
  wherein the operating and evaluating circuit is further configured to determine, on the basis of the two natural frequencies, a second media state value which represents a gas charge of the medium, under the assumption of micro-bubbles.
  wherein the operating and evaluating circuit is further configured to output a media state message into which the first media state value and the second media state value are incorporated.

The specification of two media state values gives a system operator a more comprehensive picture about the media state, even in cases in which the model underlying the individual media state values is no longer sufficient for the description of all aspects of the media state. Processing the medium can thus be controlled in a more differentiated manner.

In a development of the invention, the first media state value comprises a value dependent upon a fraction of free gas bubbles in the medium, under the assumption that free gas bubbles are causative for the fluctuations. In particular, the teachings of the as yet unpublished patent applications DE 10 2018 112 002.8 and DE 10 2019 003 075.3 can be used for this purpose, which make it possible to draw conclusions about the presence of free bubbles on the basis of the frequency fluctuations.

In a development of the invention, the second media state value depends upon a gas volume fraction in the form of micro-bubbles in the medium. Details in this regard are described in, for example, DE 10 2015 122 661 A1 and DE 10 2016 114 972 A1.

In a development of the invention, the second media state value indicates a gas volume fraction in the form of microbubbles in the medium, under the assumption that an observed ratio of the natural frequencies is due to a resonator effect in which the medium compressible due to the micro-bubbles vibrates against the measuring tube.

In a development of the invention, the operating and evaluating circuit is configured to further determine the second media state value as a function of a pressure measured value, which represents the media pressure in the measuring tube. For example, the teaching of DE 10 2016 114 972 A1 can be used for this purpose.

A measuring point that has the measuring device according to the invention accordingly comprises a pressure sensor, in order to be able to provide the measuring device with a pressure measured value.

In a development of the invention, the media state message contains, in addition to the first media state value, information about which flow regime of the first media state value was determined, wherein the information about the flow regime comprises a flow measured value or a value range of the flow measured value, wherein the flow measured value comprises in particular a flow velocity, a mass flow rate, a volume flow rate or a Reynolds number, or a range specification for the aforementioned variables.

In a development of the invention, the first media state value is normalized with a normalization function that is dependent upon a flow measured value.

In a development of the invention, the first media state value is a function of the fluctuations in the natural frequency, wherein the function furthermore exhibits a natural-frequency-dependent normalization.

In a development of the invention, the first media state value comprises a gas volume fraction of the medium in the form of free gas bubbles, or a range of values for the gas volume fraction.

The processing system according to the invention serves to process a medium which has a gas-charged liquid, wherein the processing system comprises:
at least one pipeline for conducting the medium;
at least one measuring, which is installed in the pipeline;
at least one actuator for influencing the medium;
a process control system which is connected to the measuring device and the actuator in order to receive the media state message and control the actuator, wherein the process control system comprises a data memory in which at least one target value is stored for the gas charge, characterized in that the process control system is configured to control the actuator as a function of the media state message in order to regulate the gas charge to the at least one target value.

In a further development, the actuator comprises a temperature control device for heating and/or cooling the medium, a pump, a valve, a ventilator, a stirring device, or a mixer.

The method according to the invention for monitoring a gas-charged liquid with a measuring device for measuring the density, the mass flow, and/or the viscosity of a medium, which has at least one oscillator with at least one measuring tube for conducting the gas-charged liquid, in particular with a measuring device according to the invention, comprises the following steps:
determining natural frequencies of at least two bending vibrational modes;
determining fluctuations of at least one of the natural frequencies;
determining a first media state value on the basis of the fluctuations in the natural frequency;
determining a second media state value on the basis of the two natural frequencies, which represents a gas charge of the medium, under the assumption of micro-bubbles; and
outputting a media state message into which the first media state value and the second media state value are incorporated.

BRIEF DESCRIPTION OF THE DRAWINGS

The invention is explained in the following in further detail on the basis of the exemplary embodiments shown in the figures. The following are shown:

FIG. 1 shows a schematic representation of an exemplary embodiment of a measuring device according to the present disclosure;

FIG. 2 shows a diagram, which frequency fluctuations as a function of the flow velocity of a liquid with free gas bubbles;

FIG. 3 shows a diagram showing fluctuation in the frequency as a function of the flow velocity and the volume fraction of free gas bubbles of a gas-charged liquid;

FIG. 4a shows a flowchart of a method for determining the gas volume fraction in a gas-charged liquid;

FIG. 4b shows a detailed flowchart for determining the sound velocity of the gas-charged liquid over the course of the method in FIG. 4a;

FIG. 4c shows a detailed flowchart for calculating the gas volume fraction GVF of the gas-charged liquid over the course of the method in FIG. 4a;

DETAILED DESCRIPTION

Figure 6:
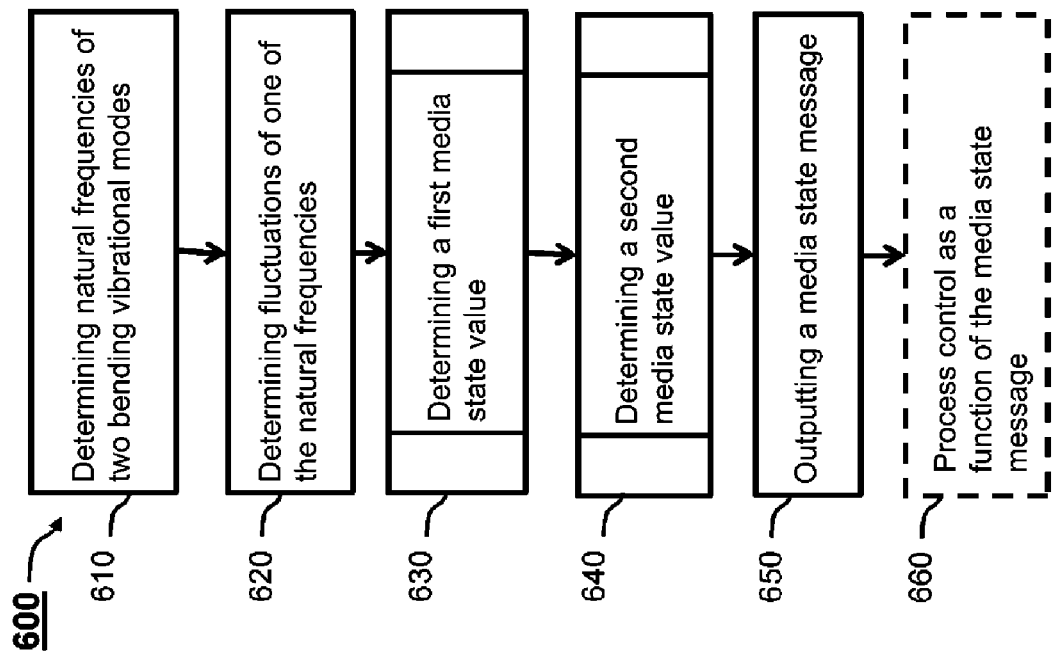
FIG. 6 shows a flowchart of an exemplary embodiment of the method according to the present disclosure.

The first exemplary embodiment of a measuring device 1 according to the invention shown in FIG. 1 comprises an oscillator 10 which comprises a pair of vibratable measuring tubes 14 which are routed in parallel and extend between an inlet-end flange 11 and an outlet-end flange 12, wherein the flanges each comprise a flow divider or collector into which the measuring tubes 14 open. The flow dividers are connected to one another by a rigid housing 15 so that vibrations of the flow dividers accommodating the measuring tubes are effectively suppressed in the range of vibrational frequencies of bending vibrational usage modes of the oscillator. The measuring tubes 10 are rigidly connected to an inlet-end node plate 20 and an outlet-end node plate 21, wherein the node plates define vibrational nodes of the oscillator 10 formed by the two measuring tubes 14, and thus largely define the frequencies of the bending vibrational usage modes. The oscillator 10 is excited to vibration by an electrodynamic exciter 17 acting between the two measuring tubes 14, wherein the vibrations are detected by means of two vibrational sensors 18, 19 capturing relative movements of the measuring tubes 14 with respect to each other. The exciter 17 is operated by an operating and evaluating circuit 30, wherein the latter also captures and evaluates the signals from the vibrational sensors in order to determine a measured density value and possibly a mass flow measured value. According to the invention, the operating and evaluating circuit 30 is also configured to determine density fluctuations on the basis of the frequency fluctuations, and to determine a media state value depending thereupon. Unlike what is shown in FIG. 1, the operating and evaluating circuit can also comprise several, spatially-separated modules. The media state values can also be calculated in a remote computing module to which the required raw data are transmitted, e.g., wirelessly.

By means of a density meter that has an oscillator with at least one vibratable measuring tube for conducting the medium, the density $\rho$ of a medium can be determined on the basis of a mode-specific, density-dependent natural frequency $f_i$ of the oscillator according to:

$$\rho(f_i) = c_{0,i} + \frac{c_{1,i}}{f_i^2}$$

The coefficients $c_{0,i}$ and $c_{1,i}$ are mode-specific coefficients, which are preferably to be determined for each measuring device type or for each measuring device. The coefficient $c_{0,i}$ is characterized by the mass of the measuring tube conducting the medium, while the coefficient $c_{1,i}$ depends upon a mode-specific stiffness of the measuring tube. The time derivative of the density $$\frac{\partial \rho}{\partial t}$$

is thus given as:

$$\frac{\partial \rho}{\partial t} = c_{1,i} \frac{-2}{f_i^3} \frac{\partial f_i}{\partial t}.$$

The time derivative of the density $$\frac{\partial \rho}{\partial t}$$

is a suitable measure for describing the density fluctuation. In order to determine this value, the observed frequency fluctuation $$\frac{\partial f_i}{\partial t}$$

of the vibrating measuring tube or the vibrating measuring tubes also has to be multiplied by a normalization factor $$c_{1,i} \frac{2}{f_i^3}.$$

In this way, the basis is created for an evaluation function which can describe the degree of inhomogeneity of the medium in the form of density fluctuations, independently of the particular type of density meter or its size. In one embodiment of the invention, the operating and evaluating circuit 30 of the above exemplary embodiment of a measuring device according to the invention is configured to carry out the density fluctuation on the basis of the frequency fluctuation by means of the above-described normalization with the reciprocal of the third power of the mode-specific natural frequency:

$$\frac{\partial \rho}{\partial t} = c_{1,i} \frac{-2}{f_i^3} \frac{\partial f_i}{\partial t}.$$

The effect of the normalization can be illustrated using data for two Coriolis mass flow meters from the applicant's company, viz., a Promass F50 and a Promass Q50, both of which have the function of a density meter. The observed natural frequency fluctuations $$\frac{\partial f_i}{\partial t}$$

differ by a factor of about 6.6 in the case of an aqueous medium with a gas charge of 1% or 2%. After normalization with the normalization factor $$c_{1,i} \frac{2}{f_i^3},$$

this results in approximately the same value for the density fluctuation $$\frac{\partial \rho}{\partial t}.$$

An equivalent analysis of the density fluctuation $$\frac{\partial \rho}{\partial t}$$

is implemented in a second development of the invention. In this case, the operating and evaluating circuit is designed to determine the density fluctuation according to:

$$\frac{\partial \rho}{\partial t} = \frac{2(\rho - c_{0,i})}{f_i} \frac{\partial f_i}{\partial t}.$$

In order to provide the magnitude of the relative density fluctuation $$\frac{\frac{\partial \rho}{\partial t}}{\rho},$$

the operating and evaluating circuit is designed according to a third development of the invention to determine the magnitude on the basis of the relative frequency fluctuation $$\frac{\frac{\partial f_i}{\partial t}}{f_i}$$

according to:

$$\left|\frac{\frac{\partial \rho}{\partial t}}{\rho}\right| = 2\left(1 + \frac{|c_{0,i}|}{\rho}\right)\left|\frac{\frac{\partial f_i}{\partial t}}{f_i}\right|$$

If the density of the medium at a measuring point varies by only a few percent around a known value, but is otherwise known from the value range, the relative density fluctuation can be estimated as a function of the relative frequency fluctuation using:

$$\left|\frac{\frac{\partial \rho}{\partial t}}{\rho}\right| \approx a_i \left|\frac{\frac{\partial f_i}{\partial t}}{f_i}\right|,$$

wherein a is a measuring-point-specific or medium-specific, and optionally mode-specific, constant, provided that several modes are used for density measurement. The described normalizations with the third power of the frequency for the density fluctuation or with the frequency itself for the relative density fluctuation are advantageous, but not absolutely necessary for the implementation of the present invention.

FIG. 2 schematically shows the curve of the frequency fluctuations df/dt as a function of the flow velocity V for a gas-charged liquid. The free gas bubbles in this case have, for example, a concentration of a few percent by volume. If V=0 or the medium is stationary, the medium in the flow meter has a constant density. Accordingly, no frequency fluctuations occur. With the onset of the flow, the measuring device is subjected to variable, locally-fluctuating distributions of free gas bubbles in the liquid over time, which can be observed as density fluctuations, e.g., in the form of frequency fluctuations df/dt. At first, the frequency fluctuations df/dt increase with increasing velocity. However, if the velocity increases further, the mean density of a greater quantity of media is included in a measured frequency value, so that local density fluctuations become less important. Accordingly, the frequency fluctuations df/dt become smaller again.

FIG. 3 shows a topographical representation in which frequency fluctuations df/dt are shown over the flow velocity and a free gas volume fraction. In order to create such a map, the frequency fluctuation as a function of the velocity V can be captured in each case for various free gas volume fractions $a_i$ of a particular combination of gas and liquid. In the present diagram, the gas volume fraction $a_i$ increases as the index i increases, and may, for example, be i percent by volume. After an adequate database has been created, the frequency fluctuations df/di can be represented and modeled as a function of the velocity V and of the minority concentration a, e.g., in the topographical representation selected here, wherein the lines $fl_j$ in each case connect together points of the same frequency fluctuations df/dt, wherein the fluctuation flj increases as the index j increases.

In measuring mode, a first estate value can then be assigned to a frequency fluctuation df/dt as a function of the flow velocity V that results from a momentary mass flow rate and the current mean density of the medium. Depending upon the flow velocity, two different media state values $M1_1$ and $M1_2$ result for the same observed frequency fluctuation $fl_5$, as shown in FIG. 3. The first media state values can differ in significance, depending upon the question or measuring task of a measuring point.

On the one hand, the first media estate value may correspond to the gas volume fraction $a_1$ or be a linear function of the gas volume fraction. This can be useful, for example, if the gas volume fraction $a_1$ is a process variable to be monitored or regulated.

On the other hand, the first media state value may also correspond to exceeding a critical monitoring variable; for example, all frequency fluctuations that correspond to a gas volume fraction below $a_3$ would be mapped to a first media state value $M1_2$, while all frequency fluctuations that correspond to a gas volume fraction above $a_3$ would be mapped to a first media state value $M1_1$, wherein $M1_1$ corresponds to a critical state.

The first media state value M1 is to be detected, communicated, or signaled in a suitable manner.

In a simpler embodiment of the invention, tuples of frequency fluctuations and associated velocities are output as first media state values.

In the context of the discussion of FIGS. 2 and 3, frequency fluctuations df/dt were described. Naturally, prior to determining the media state value, these frequency fluctuations can be normalized with the third power of the vibrational frequency of the oscillator, in order to determine the first media state value on the basis of the density fluctuations. The same applies to the normalization described above at the vibrational frequency, in order to determine the media state value on the basis of relative density fluctuations. Furthermore, the presentation in FIGS. 2 and 3 can also be made over the mass flow rate, the volume flow rate, or the Reynolds number, instead of over the flow velocity V. Depending upon the embodiment of the invention, the operating and evaluating circuit of the measuring device is designed to carry out the required calculations.

Below, the steps for determining a second media state value are described with reference to FIGS. 4a, 4b, and 4c. The method 400 shown in FIG. 4a for determining the gas volume fraction of a gas-charged liquid begins in a step 410 with the determination of the natural frequencies of the f1 bending vibrational mode and the f3 bending vibrational mode of a Coriolis mass flow meter. For this purpose, the f1 bending vibrational mode and the f3 bending vibrational mode can, in particular, be excited simultaneously. By maximizing the ratio of the vibration amplitude to the mode-specific excitation power by varying the excitation frequencies, the natural frequencies sought can be determined. By using the determined natural frequencies fi, preliminary density values $\rho_1$ and $\rho_3$ are determined in a step 420 as:

$$\rho_i = c_{0i} + c_{1i}\frac{1}{f_i^2} + c_{2i}\frac{1}{f_i^4},$$

where $c_{0i}$, $c_{1i}$, and $c_{2i}$ are mode-dependent coefficients.

In a step 430, which is described further below with reference to FIG. 4b, the sound velocity of the gas-charged liquid and, optionally, a correction term for the density measurement are determined. Subsequently, in a step 440, a gas volume fraction is calculated by means of the sound velocity, as further described below, on the basis of FIG. 4c.

As shown in FIG. 4b, the step 430 for determining the correction term first comprises, in a step 431, calculating the ratio V of the preliminary density values, i.e., for example, the division of the preliminary density values $\rho_1$ and $\rho_3$ to V:=$\rho_1/\rho_3$.

Subsequently, in a step 432, a value of the sound velocity c is determined, which, at the measured natural frequencies $f_1$ and $f_2$ of the bending vibrational modes, leads to the observed ratio V of the preliminary density values in the following equation:

$$\frac{\left(1 + \frac{r}{\left(\frac{g \cdot c}{f_1}\right)^2 - b}\right)}{\left(1 + \frac{r}{\left(\frac{g \cdot c}{f_3}\right)^2 - b}\right)} = V$$

where r is approximately 0.84, b=1 and g is a measuring-tube-dependent fractionality factor between sound velocity and resonance frequency, which can, for example, assume a value of 10 m$^{-1}$. The value of the sound velocity that satisfies the above equation is the value sought for the sound velocity of the gas-charged liquid.

On the basis of the determined sound velocity value, in step 433 of the method in FIG. 4b, a mode-specific correction term K for the resonator effect can then be calculated according to:

$$K_i := \left(1 + \frac{r}{\left(\frac{g \cdot c}{f_i}\right)^2 - 1}\right).$$

A mixing density value $\rho_{mix-coriolis}$ corrected for the resonator effect can finally be calculated as:

$$\rho_{mix-coriolis} := \frac{\rho_i}{K_i}$$

A corresponding mass flow correction term Km for calculating a mass flow measured value $rh_{mix-coriolis}$ corrected for the influence of the resonator effect can be calculated in step 434 as:

$$K_{\dot{m}} := \left(1 + \frac{2r}{\left(\frac{g \cdot c}{f_1}\right)^2 - 1}\right).$$

The mass flow measured value $rh_{mix-coriolis}$ corrected for the influence of the resonator effect then results as:

$$\dot{m}_{mix-coriolis} := \frac{\dot{m}}{K_{\dot{m}}}$$

In this case, rh is a preliminary mass flow measured value which results from multiplying a calibration factor for the measurement sensor by the phase angle between the first bending vibrational mode and the Coriolis mode.

In the following, it will be explained how the gas volume fraction in the form of micro-bubbles and the density of the liquid can be determined.

The following known relationship between the sound velocity of a gas-charged liquid and further parameters exists, according to Sorokin:

$$c = \left[\frac{\alpha}{c_g^2} + \frac{(1-\alpha)^2}{c_l^2} + \frac{\alpha(1-\alpha) \cdot \rho_l}{\gamma \cdot p}\right]^{-\frac{1}{2}}$$

In this case, $\alpha$ is the gas volume fraction (or the gas void fraction GVF), $c_g$ is the sound velocity of the pure gas, $c_l$ is the sound velocity of the pure liquid, $\gamma$ is the adiabate coefficient for the gas, p is the current pressure of the gas-charged liquid, and $\rho_l$ is the density of the gas-charged liquid.

In fact, the sum in parentheses on the right side of the equation over the pressure range, in which gas charges are relevant as disturbance variables, and at fluid densities on the order of 10$^3$ kg/m$^3$, is essentially determined by the third sum. The above expression is thus reduced to:

$$c \approx \left[\frac{\alpha(1-\alpha)}{\gamma \cdot p} \cdot \rho_l\right]^{-\frac{1}{2}}$$

The gas volume fraction $\alpha$ can therefore be estimated as a function of the other parameters in the equation. If the quotient from the already determined Coriolis mixture density $\rho_{mix-coriolis}$ divided by the liquid volume fraction, i.e., (1-$\alpha$), is set for the liquid density $\rho_l$, the following results:

$$a \approx \frac{\gamma \cdot p}{\rho_{mix-coriolis} \cdot c^2}$$

For this purpose, as shown in FIG. 4c, in step 441, a pressure value of the gas-charged liquid is determined that prevails in the measuring tubes at the time of measuring the natural frequencies $f_1$ and $f_3$, and then the sound velocity c is determined on the basis thereof.

The adiabate coefficient $\gamma = c_p/c_v = (f+2)/f$, where f is the number of molecular degrees of freedom of the gas, is, at room temperature, 1.4 for nitrogen and dry air, and 1.3 for methane, for example. Depending upon which gas or gas mixture is to be expected, a corresponding adiabatic coefficient can be used. On the basis of these variables, the gas volume fraction $\alpha$ is then calculated in step 442.

As shown in FIG. 4a in step 450, by means of the mixture density $\rho_{mix-coriolis}$ and by means of the gas volume fraction $\alpha$, a value for the liquid density $\rho_{liquidGVF}$ of the gas-charged liquid can be calculated according to:

$$\rho_{liquidGVF} = \rho_{mix-coriolis}/(1-\alpha)$$

This liquid density is of interest in that, for example, it enables an estimation of the fractions of the components for liquids that comprise a solution or homogeneous mixture of two components of different densities.

The gas volume fraction $\alpha$, the mixture density $\rho_{mix-coriolis}$, or the liquid density $\rho_{liquidGVF}$ of the gas-charged liquid can be output as the second media state value. Optionally, several of these parameters can be output as further media state values, wherein a user can select which parameter(s) is/are to output as the second or further media state value. The operating and evaluating circuit is preferably configured in such a way that a user can freely select the parameter(s) to be output with the media state message.

Figure 5:
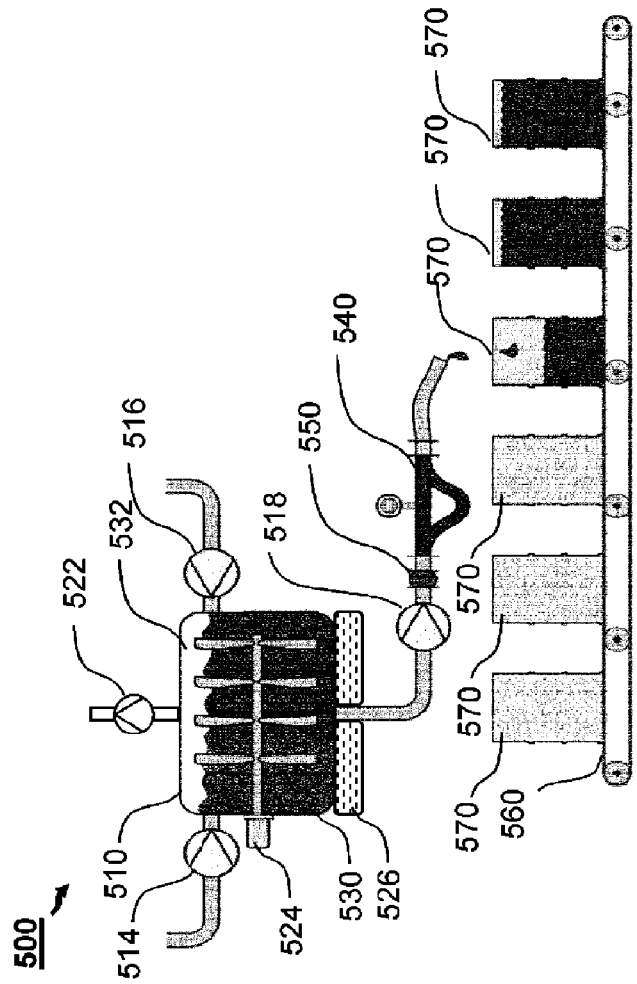
FIG. 5 shows a schematic representation of an exemplary embodiment of a processing system according to the present disclosure.

The example shown in FIG. 5 of a processing system 500 according to the invention is used to produce and fill a viscous medium, e.g., liquid adhesive or mustard 530. The processing system 500 comprises a reactor vessel 510 and a series of actuators, viz., two inlet pumps 514, 516 for feeding components of the medium, a filling pump 518, a low vacuum pump 522 connected to an upper opening of the reactor vessel 510, an agitator 524 for mixing the components, and a temperature control device 526. Furthermore, the processing system 500 comprises a Coriolis mass-flow and density-measuring device 540 according to the invention, and a pressure sensor 550 which is arranged upstream of the Coriolis mass-flow and density-measuring device 540 in order to determine a pressure measured value representative of the medium in the Coriolis mass-flow and density-measuring device 540. Finally, the process system 500 comprises a conveyor system 560 for supplying and removing containers 570 to be filled.

While the processing system is operating, various phenomena occur which can cause a gas charge in the medium 530 which impairs the product quality.

First, the agitator 524 can stir macroscopic, free bubbles into the liquid phase if the fill-level of the mixture 530 in the reactor vessel 510 is too low and if the residual gas charge is too large. Likewise, air bubbles can be sucked in by the pump 518 if the reactor vessel is emptied too far.

Secondly, during a reaction or upon mixing the components, micro-bubbles may arise, which are suspended in the liquid phase. In order to expel the micro-bubbles, the space 532 in the reactor 510 above the mixture 530 can be evacuated with the low vacuum pump 522. The viscosity of the mixture 530 can be reduced via the temperature control device 526. In addition, the mixture 530 can be circulated with the agitator in order to facilitate the expulsion of the micro-bubbles.

The Coriolis mass-flow and density-measuring device 540 according to the invention is configured to be able to detect and distinguish both types of gas charges. The first media state value signals the presence of free bubbles at the frequency fluctuation observable when adding the medium 530. By contrast, the first media state value is "blind" to homogeneously-distributed micro-bubbles, since these do not cause frequency fluctuations. Depending upon the embodiment, the second media state value can have a mixture density value, which can already be indicative of a gas charge with micro-bubbles, due to the deviation from a reference density for the liquid phase, or an explicit value for the gas volume fraction. However, due to the underlying model, the second media state value is not able to appropriately describe the fraction of free gas bubbles. In combination, however, the two state values provide a comprehensive description of the media state with regard to the gas charge, so that a system operator can take this into account in the process control by operating the actuators in such a way that the gas charge corresponds to a target value range.

In the exemplary embodiment of the method 600 according to the invention shown in FIG. 6, the natural frequencies of two bending vibrational modes of an oscillator are detected in a first step 610, which oscillator has measuring tubes of a vibronic density or flow meter for conducting a medium.

Subsequently, for at least one of the natural frequencies, frequency fluctuations are determined in a second step 620, which enable the determination of a first media state value in a third step 630, as described above in connection with FIGS. 2 and 3. This media state value describes, in particular, the volume fraction of free gas bubbles in the liquid, or correlates therewith.

In a fourth step 640, a second media state value, which can in particular comprise a mixture density or a gas volume fraction, is determined on the basis of the two natural frequencies and, if applicable, a pressure measured value. Details in this regard are described above in connection with FIGS. 4*a* through *d*.

In a fifth step 650, a media state message is output into which the two media state values are incorporated. Optionally, in a sixth step 660, a process can then be controlled as a function of the media state message in order to regulate a gas charge in a liquid to a target value.

The invention claimed is:

1. A measuring device for determining the density, the mass flow, or the viscosity of a gas-charged liquid, comprising: at least one oscillator which has at least one vibratable measuring tube for conducting the medium, and which has at least two vibrational modes whose natural frequencies depend upon the average density of the gas-charged liquid and on the gas volume fraction of the gas-charged liquid; at least one exciter for exciting both vibrational modes; at least one vibrational sensor for detecting vibrations of the oscillator; and an operating and evaluating circuit configured to apply an excitation signal to the exciter, to detect signals of the vibrational sensor, to determine current values of the natural frequencies of both vibrational modes of the oscillator and fluctuations of at least one of the natural frequencies on the basis of the signals of the vibrational sensor, wherein the operating and evaluating circuit is further configured to determine a first media state value on the basis of the fluctuations, wherein the operating and evaluating circuit is further configured to determine, on the basis of the two natural frequencies, a second media state value which represents a gas charge of the medium, wherein the operating and evaluating circuit is further configured to output a media state message into which the first media state value and the second media state value are incorporated; wherein the first media state value identifies a presence of free gas bubbles in the medium; wherein the second media state identifies a gas charge with microbubbles; wherein the operating and evaluating circuit is configured to further determine the second media state value as a function of a pressure value which represents the media pressure in the measuring tube; wherein the media state message contains, in addition to the first media state value information about which flow regime of the first media state value was determined, wherein the information about the flow regime comprises a flow measured value or a value range of the flow measured value, wherein the flow measured value comprises a flow velocity, a mass flow rate, a volume flow rate or a Reynolds number; wherein the media stage message identifies a state of the medium with regard to gas charge based on the presence of free gas bubbles and the gas charge with microbubbles.

2. A measuring device for determining the density, the mass flow, or the viscosity of a gas-charged liquid, comprising:
   at least one oscillator which has at least one vibratable measuring tube for conducting the medium, and which has at least two vibrational modes whose natural frequencies depend upon the average density of the gas-charged liquid and on the gas volume fraction of the gas-charged liquid;
   at least one exciter for exciting both vibrational modes;
   at least one vibrational sensor for detecting vibrations of the oscillator; and
   an operating and evaluating circuit configured to apply an excitation signal to the exciter, to detect signals of the vibrational sensor, to determine current values of the natural frequencies of both vibrational modes of the oscillator and fluctuations of at least one of the natural frequencies on the basis of the signals of the vibrational sensor, wherein the operating and evaluating circuit is further configured to determine a first media state value on the basis of the fluctuations, wherein the operating and evaluating circuit is further configured to determine, on the basis of the two natural frequencies, a second media state value which represents a gas charge of the medium, wherein the operating and evaluating circuit is further configured to output a media state message into which the first media state value and the second media state value are incorporated;

wherein the first media state value identifies a presence of free gas bubbles in the medium;

wherein the second media state identifies a gas charge with microbubbles;

wherein the operating and evaluating circuit is configured to further determine the second media state value as a function of a pressure value which represents the media pressure in the measuring tube;

wherein the first media state value is normalized with a normalization function that is dependent upon the flow measured value;

wherein the media stage message identifies a state of the medium with regard to gas charge based on the presence of free gas bubbles and the gas charge with microbubbles.

3. The measuring device of claim 1, wherein the first media state value is a function of the fluctuations in the natural frequency, wherein the function furthermore exhibits a natural-frequency-dependent normalization.

4. The measuring device of claim 1, wherein the first media state value comprises a gas volume fraction of the medium in the form of free gas bubbles or a range of values for the gas volume fraction.

5. A processing system for processing a medium having a gas-charged liquid, wherein the processing system comprises:
at least one pipeline for conducting the medium;
at least one measuring device according to claim 1, which is installed in the pipeline;
at least one actuator for influencing the medium;
a process control system which is connected to the measuring device and the actuator in order to receive the media state message and control the actuator, wherein the process control system comprises a data memory in which at least one target value is stored for the gas charge, wherein the process control system is configured to control the actuator as a function of the media state message in order to regulate the gas charge to the at least one target value.

6. The processing system of claim 5 for processing a medium, wherein the actuator comprises a temperature control device, a pump, a valve, a ventilator, a stirring device, or a mixer.

7. A method for monitoring a gas-charged liquid with a measuring device, which has at least one oscillator with at least one measuring tube for conducting the gas-charged liquid, wherein the measuring device includes at least one oscillator which has at least one vibratable measuring tube for conducting the medium, and which has at least two vibrational modes whose natural frequencies depend upon the average density of the gas-charged liquid and on the gas volume fraction of the gas-charged liquid, at least one exciter for exciting both vibrational modes; at least one vibrational sensor for detecting vibrations of the oscillator; and an operating and evaluating circuit configured to apply an excitation signal to the exciter, to detect signals of the vibrational sensor, to determine current values of the natural frequencies of both vibrational modes of the oscillator and fluctuations of at least one of the natural frequencies on the basis of the signals of the vibrational sensor, wherein the operating and evaluating circuit is further configured to determine a first media state value on the basis of the fluctuations, wherein the operating and evaluating circuit is further configured to determine, on the basis of the two natural frequencies, a second media state value which represents a gas charge of the medium, wherein the operating and evaluating circuit is further configured to output a media state message into which the first media state value and the second media state value are incorporated, wherein the method comprises the following steps: determining natural frequencies of at least two bending vibrational modes; determining fluctuations of at least one of the natural frequencies; determining a first media state value based on the fluctuations in the natural frequency; determining a second media state value based on the two natural frequencies, which represent a gas charge of the medium; and outputting a media state message into which the first media state value and the second media state value are incorporated; wherein the first media state value identifies a presence of free gas bubbles in the medium; wherein the second media state identifies a gas charge with microbubbles: wherein the first media state value comprises a value dependent upon a fraction of free gas bubbles in the medium; wherein the second media state value depends upon a gas volume fraction in the form of micro-bubbles in the medium; wherein the second media state value indicates a gas volume fraction in the form of micro-bubbles in the medium; wherein the operating and evaluating circuit is configured to further determine the second media state value as a function of a pressure value which represents the media pressure in the measuring tube; wherein the media state message contains, in addition to the first media state value, information about which flow regime of the first media state value was determined, wherein the information about the flow regime comprises a flow measured value or a value range of the flow measured value, wherein the flow measured value comprises a flow velocity, a mass flow rate, a volume flow rate or a Reynolds number; wherein the media stage message identifies a state of the medium with regard to gas charge based on the presence of free gas bubbles and the gas charge with microbubbles.

8. The measuring device of claim 2, wherein the first media state value is a function of the fluctuations in the natural frequency, wherein the function furthermore exhibits a natural-frequency-dependent normalization.

9. The measuring device of claim 2, wherein the first media state value comprises a gas volume fraction of the medium in the form of free gas bubbles or a range of values for the gas volume fraction.

10. A processing system for processing a medium having a gas-charged liquid, wherein the processing system comprises:
at least one pipeline for conducting the medium;
at least one measuring device according to claim 2, which is installed in the pipeline;
at least one actuator for influencing the medium;
a process control system which is connected to the measuring device and the actuator in order to receive the media state message and control the actuator, wherein the process control system comprises a data memory in which at least one target value is stored for the gas charge, wherein the process control system is configured to control the actuator as a function of the media state message in order to regulate the gas charge to the at least one target value.

11. A method for monitoring a gas-charged liquid with a measuring device, which has at least one oscillator with at least one measuring tube for conducting the gas-charged liquid,
- wherein the measuring device includes at least one oscillator which has at least one vibratable measuring tube for conducting the medium, and which has at least two vibrational modes whose natural frequencies depend upon the average density of the gas-charged liquid and on the gas volume fraction of the gas-charged liquid;
- at least one exciter for exciting both vibrational modes;
- at least one vibrational sensor for detecting vibrations of the oscillator; and
- an operating and evaluating circuit configured to apply an excitation signal to the exciter, to detect signals of the vibrational sensor, to determine current values of the natural frequencies of both vibrational modes of the oscillator and fluctuations of at least one of the natural frequencies on the basis of the signals of the vibrational sensor,
- wherein the operating and evaluating circuit is further configured to determine a first media state value on the basis of the fluctuations,
- wherein the operating and evaluating circuit is further configured to determine, on the basis of the two natural frequencies, a second media state value which represents a gas charge of the medium,
- wherein the operating and evaluating circuit is further configured to output a media state message into which the first media state value and the second media state value are incorporated, wherein the method comprises the following steps:
- determining natural frequencies of at least two bending vibrational modes;
- determining fluctuations of at least one of the natural frequencies;
- determining a first media state value based on the fluctuations in the natural frequency;
- determining a second media state value based on the two natural frequencies, which represent a gas charge of the medium; and
- outputting a media state message into which the first media state value and the second media state value are incorporated;
- wherein the first media state value identifies a presence of free gas bubbles in the medium;
- wherein the second media state identifies a gas charge with microbubbles;
- wherein the first media state value is normalized with a normalization function that is dependent upon the flow measured value;
- wherein the media stage message identifies a state of the medium with regard to gas charge based on the presence of free gas bubbles and the gas charge with microbubbles.

* * * * *